United States Patent
Ljung

(10) Patent No.: US 9,998,988 B2
(45) Date of Patent: Jun. 12, 2018

(54) POWER CONSUMPTION MANAGEMENT BASED ON INACTIVITY TIMER

(71) Applicant: Sony Corporation, Tokyo (JP)

(72) Inventor: Rickard Ljung, Helsingborg (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 236 days.

(21) Appl. No.: 14/372,128

(22) PCT Filed: Apr. 30, 2013

(86) PCT No.: PCT/EP2013/058955
§ 371 (c)(1),
(2) Date: Jul. 14, 2014

(87) PCT Pub. No.: WO2014/177186
PCT Pub. Date: Nov. 6, 2014

(65) Prior Publication Data
US 2015/0327167 A1   Nov. 12, 2015

(51) Int. Cl.
*H04W 52/02* (2009.01)
*H04W 76/04* (2009.01)
(Continued)

(52) U.S. Cl.
CPC ....... *H04W 52/0209* (2013.01); *H04W 24/02* (2013.01); *H04W 52/0251* (2013.01); *H04W 76/048* (2013.01); *H04W 76/068* (2013.01)

(58) Field of Classification Search
CPC ..... H04W 24/02; H04W 24/04; H04W 76/04; H04W 76/048
See application file for complete search history.

(56) References Cited

U.S. PATENT DOCUMENTS

| | | | |
|---|---|---|---|
| 7,242,972 B2 * | 7/2007 | Harris | H04W 8/22 455/434 |
| 2002/0172178 A1 * | 11/2002 | Suzuki | H04W 76/068 370/338 |

(Continued)

FOREIGN PATENT DOCUMENTS

| | | |
|---|---|---|
| CN | 102625421 A | 8/2012 |
| WO | 2008004109 A1 | 1/2008 |
| WO | 2013050648 A1 | 4/2013 |

OTHER PUBLICATIONS

Intel Corporation: "Mechanism for UE Mobility State Indication", 3GPP Draft; R2-123966 Mechanism Mobility State Indication, 3rd Generation Partnership Project (3GPP), Mobile Competence Centre; 650, Route Des Lucioles; F-06921 Sophia-Antipolis Cedex; France, vol. RAN WG2, No. Qingdao, China; Aug. 13, 2012-Aug. 17, 2012; Aug. 6, 2012, XP050665414, Retrieved from the Internet: URL: http://www.3gpp.org/ftp/tsg_ran/WG2_RL2/TSGR2_79/ Docs.

(Continued)

*Primary Examiner* — Ian N Moore
*Assistant Examiner* — Ronald H Davis
(74) *Attorney, Agent, or Firm* — Tucker Ellis, LLP

(57) ABSTRACT

A user equipment (30) has an idle mode and a connected mode and is configured to perform discontinuous reception when in the connected mode. The user equipment (30) comprises a wireless interface (31) configured to receive a message from a mobile communication network (10, 14, 15) causing the user equipment (30) to make a transition from the connected mode to the idle mode after inactivity of the user equipment (30) for a time period defined by an inactivity timer value. A processing device (32) is configured to determine whether the inactivity timer value is to be adjusted in the mobile communication network (10, 14, 15), and to control the wireless interface (31) to transmit a signal (Continued)

to the mobile communication network (10, 14, 15) to request an adjustment of the inactivity timer value.

18 Claims, 7 Drawing Sheets

(51) Int. Cl.
*H04W 24/02* (2009.01)
*H04W 76/06* (2009.01)

(56) References Cited

U.S. PATENT DOCUMENTS

| | | | |
|---|---|---|---|
| 2005/0287949 A1* | 12/2005 | Harris | H04W 52/0216 |
| | | | 455/9 |
| 2010/0144363 A1 | 6/2010 | De Rosa et al. | |
| 2012/0207069 A1* | 8/2012 | Xu | H04W 52/0222 |
| | | | 370/311 |
| 2013/0003577 A1* | 1/2013 | Gupta | H04W 52/0225 |
| | | | 370/252 |
| 2013/0084850 A1 | 4/2013 | Martin et al. | |

OTHER PUBLICATIONS

International Search Report issued in corresponding PCT application No. PCT/EP2013/058955, dated May 23, 2014, 6 pages.
International Preliminary Report on Patentability from corresponding International Application No. PCT/EP2013/058955, dated Nov. 12, 2015.

* cited by examiner

POWER CONSUMPTION MANAGEMENT BASED ON INACTIVITY TIMER

FIELD OF THE INVENTION

Embodiments of the invention relate to devices for use with mobile communication networks. Embodiments of the invention relate in particular to a user equipment which can be set to different operation states and to methods performed by such devices. Embodiments of the invention relate in particular to a user equipment which receives a message from a radio access network to enter an idle mode after inactivity of the user equipment causes an inactivity timer to expire in the radio access network.

BACKGROUND OF THE INVENTION

With increasing popularity of mobile voice and data communication, there is an ever increasing demand for high-speed data communication. The Long Term Evolution (LTE) communication standard was developed to accommodate increasing capacity and speed for data transmission over an air interface. LTE is standardized by the Third Generation Partnership Project (3GPP), with Release 11 being the most recent Release of the LTE specifications. The air interface of LTE, called Evolved Universal Terrestrial Radio Access (E-UTRA), is based on and represents an evolution of wideband code division multiple access (WCDMA). The WCDMA specifications are also promulgated by 3GPP.

In addition to high speed and high capacity, long battery lifetime is an important factor for users of a user equipment (UE). Discontinuous reception (DRX) is one technique which may be user to reduce an average power consumption and thereby increase battery lifetime. In a DRX state, the mobile terminal or other UE is allowed to power down for certain time periods and the network knows not to send transmissions to that mobile terminal during these time periods.

In LTE, according to 3GPP E-UTRA specifications, a terminal can be in different modes (also referred to as states). The modes include an idle mode which has the lowest power consumption. The modes include a connected mode, which may have several sub-states. In the various sub-states of the connected mode, the UE may be in a Radio Resource Control (RRC) connected state. The sub-states may include at least one sub-state in which no DRX is performed, and one or several sub-states in which DRX is performed. The purpose of the different modes is to define a good balance between required network resources, UE power consumption, and data traffic delays.

When the UE initiates a new data transfer it will move from idle mode to an active state and will stay in the active state until no data should be immediately transmitted. At that point of time the UE will be moved to a DRX state. After an inactivity timer timeout, the network will cause the UE to make a transition from the connected mode to idle mode again.

The inactivity timer which determines when the UE will be caused to make a transition from the connected mode to the idle mode is also referred to as "inactivity timer T3" in the art. The inactivity timer value which determines the time period after which the UE will be caused to make the transition to idle mode again defines the time period for inactivity over the air interface after which a radio access network (RAN) sends a message to the UE to move it to the idle state. This inactivity timer value is typically not transmitted to the UE. The inactivity timer T3 is maintained in the RAN, and a node of the RAN transmits a message to the UE to indicate that the UE shall enter the idle mode.

The inactivity timers which determine when the UE shall make a transition to a mode with lower energy consumption may be configured by the RAN according to a suitable decision algorithm. The decision algorithm may take UE power consumption into account. However, it may still be difficult for the network to set proper inactivity timer values, since the parameters which are set are compromises between different aspects which include data traffic delay, UE power consumption, and network load, as well as possibly other target quantities.

With a view to battery lifetime of the UE, it would in general be desirable to only be in the connected mode without DRX when data transmissions are ongoing, and then move into the state with lowest power consumption very quickly, which typically corresponds to the idle mode. This could be achieved with short inactivity timers. However other aspects are considered in the network. For illustration, the amount of signalling required to cause a UE to change between modes or sub-states as well as the additional delay before data transmissions that could be a result of frequent changes may cause the RAN to keep UEs in active states for many seconds after each data transmission. This may be inefficient as regards the battery lifetime of the UE.

There are various scenarios in which the inactivity timer value which governs transitions from the connected mode to the idle mode set by the RAN causes too high power consumption in the UE. On exemplary scenario is when the UE has to perform an RRC reconnection which occurs with a short delay after the UE has been moved to idle mode.

BRIEF SUMMARY OF THE INVENTION

There is a continued need in the art for a user equipment, a radio access network node, a communication system, and methods which mitigate the problems associated with unsuitable inactivity timer values set by the network. There is in particular a continued need in the art for such devices, systems, and methods in which the battery lifetime of the user equipment may be increased when the radio access network has configured an inactivity timer in an unsuitable way.

According to embodiments, a signal from a user equipment to a network is introduced which indicates that the current settings selected by the network are unfavourable and that the user equipment should be allowed to maintain a connected mode instead of doing repeated Radio Resource Control (RRC) disconnections/connections. The signal may indicate that the inactivity timer value should be changed by the network.

A user equipment according to an embodiment has an idle mode and a connected mode. The user equipment comprises a wireless interface configured to receive a message from a mobile communication network, the message causing the user equipment to make a transition from the connected mode to the idle mode after inactivity of the user equipment for a time period which is defined by an inactivity timer value. The user equipment comprises a processing device configured to determine whether the inactivity timer value is to be adjusted in the mobile communication network. The processing device is configured to control the wireless interface to transmit a signal to the mobile communication network to request an adjustment of the inactivity timer value.

The processing device may be configured to monitor transitions between the connected mode and the idle mode. The processing device may be configured to determine whether the inactivity timer value is to be adjusted based on the monitored transitions.

The processing device may be configured to analyse a timing of the transitions between the connected mode and the idle mode.

The processing device may be configured to determine whether the inactivity timer value is to be increased, thereby requesting a longer period of user equipment inactivity before the user equipment is caused to enter idle mode, or whether the inactivity timer value is to be decreased, thereby requesting a shorter period of user equipment inactivity before the user equipment is caused to enter idle mode.

The processing device may be configured to perform at least one threshold comparison to determine whether the inactivity timer value is to be adjusted. The processing device may perform a first threshold comparison to determine whether the inactivity timer value is to be increased. The processing device may additionally or alternatively perform a second threshold comparison to determine whether the inactivity timer value is to be decreased.

The processing device may be configured to establish the inactivity timer value based on the monitored transitions. The processing device may be configured to compare the established inactivity timer value to a first threshold to determine whether the inactivity timer value is to be increased. The processing device may be configured to compare the established inactivity timer value to a second threshold to determine whether the inactivity timer value is to be decreased. The second threshold may be different from the first threshold.

The user equipment may be configured to perform discontinuous reception when the user equipment is in the connected mode. The user equipment may have one discontinuous reception state or several discontinuous reception states while operating in the connected mode.

The wireless interface may comprise a modem which is controlled according to a further timer value when the user equipment is in the discontinuous reception mode. The further timer value may define a DRX cycle time. The further timer value may be set in the user equipment by another message received from the mobile communication network. The processing device may be configured to determine the second threshold in dependence on the further timer value.

The signal transmitted by the user equipment to request an adjustment of the inactivity timer value may comprise one of a first indicator indicating that the inactivity timer value is to be increased or a second indicator indicating that the inactivity timer value is to be decreased. The first or second indicator may be different values of a purpose bit.

The user equipment may remain in the connected mode for an increased time period after transmission of the signal which comprises the first indicator. The user equipment may remain in a long cycle DRX state for an increased time period after transmission of the signal which comprises the first indicator.

The signal transmitted by the user equipment may be a Radio Resource Control Reconfiguration message.

The wireless interface may be configured to transmit and receive messages in accordance with E-UTRA. The mobile communication network may be a LTE communication network.

The processing device may be configured to perform a radio access technology prioritization. The radio access technology prioritization may determine whether the user equipment will use the mobile communication network, e.g. a LTE network, or a different second mobile communication network.

The processing device may be configured to perform the radio access technology prioritization based on a measured parameter of a radio access network of the mobile communication network. The measured parameter may be a received power, i.e. signal strength, received by the user equipment from a base station of the radio access network.

The processing device may be configured to apply a penalty to the measured parameter of the radio access network if a power consumption after transmission of the signal exceeds a target power consumption. The processing device may thereby perform an intelligent prioritization in which the user equipment is less likely to prioritize LTE, for example, over other radio access technologies if this would result in a too high power consumption.

A radio access network node according to an embodiment is configured to set an inactivity timer value for a user equipment. The radio access network node is configured to transmit a message to the user equipment causing the user equipment to enter an idle mode in response to detecting an inactivity of the user equipment over a time period defined by the inactivity timer value. The radio access network node is configured to receive a signal from the user equipment requesting an adjustment of the inactivity timer value. The radio access network node is configured to adjust the inactivity timer value in response to the received signal.

The radio access network node may be configured to increase the inactivity timer value if the signal comprises a first indicator indicating that the inactivity timer value is to be increased. The radio access network node may be configured to decrease the inactivity timer value if the signal comprises a second indicator indicating that the inactivity timer value is to be decreased.

The radio access network node may be an eNodeB.

A method of controlling transitions between an idle mode and a connected mode of a user equipment according to an embodiment is provided. The user equipment receives a message from a mobile communication network causing the user equipment to make a transition from the connected mode to the idle mode after inactivity of the user equipment for a time period defined by an inactivity timer value. The method comprises determining, by the user equipment, whether the inactivity timer value is to be adjusted in the mobile communication network. The method comprises transmitting, by the user equipment, a signal to the mobile communication network to request an adjustment of the inactivity timer value.

The method may comprise monitoring transitions of the user equipment between the connected mode and the idle mode.

The user equipment may establish, based on the monitored transitions, whether the inactivity timer value is to be increased or whether the inactivity timer value is to be decreased.

At least one threshold comparison may be performed by the user equipment to determine whether the inactivity timer value is to be adjusted. A first threshold comparison may be performed to determine whether the inactivity timer value is to be increased. A second threshold comparison may be performed to determine whether the inactivity timer value is to be decreased.

The method may comprise performing a radio access technology prioritization.

The method may comprise selectively adjusting a measured parameter of a radio access network of the mobile communication network, and using the adjusted measured parameter as an input parameter for the radio access technology prioritization. The measured parameter may be a received power received by the user equipment from the radio access network.

Adjusting the measured parameter may comprise applying a penalty to the measured parameter of the radio access network if a power consumption after transmission of the signal exceeds a target power consumption.

The method may be performed by the user equipment of any embodiment.

The devices, systems, and methods described above allow the user equipment to signal to the radio access network that the inactivity timer value which governs the transitions to idle mode shall be adjusted. This functionality may solve issues with unnecessary high network loads and user equipment power consumptions due to Radio Resource Control disconnection and reconnections which occur after a short delay. Such behaviour may be caused by non-optimal inactivity timer values. The requested adjustment of the inactivity timer will be beneficial for both an operator of a mobile communication network and an end user.

According to embodiments, an intelligent network prioritization may be performed in the user equipment, with the network prioritization depending on an inactivity timer value used by a first radio access network. The prioritization may help increase battery lifetime of the user equipment.

A user equipment according to an embodiment comprises at least one wireless interface configured for wireless communication according to a first radio access technology and at least one second radio access technology. The user equipment is configured to make a transition from a connected mode to an idle mode in response to receiving a release message from a first radio access network based on an inactivity timer value when operating in accordance with the first radio access technology. The user equipment has a prioritization logic configured to perform radio access technology prioritization. The prioritization logic is configured to determine whether the inactivity timer value causes an increased power consumption when the first radio access technology is used. The prioritization logic is configured to selectively adjust a measured parameter of the first radio access technology if the inactivity timer value leads to the increased power consumption when the first radio access technology is used, and to use the adjusted measured parameter as an input parameter of the radio access technology prioritization.

The measured network parameter may be a measured received power, i.e. measured signal strength, for the first radio access technology, which is measured at the user equipment.

The prioritization logic may be configured to apply a penalty to the measured received power if the inactivity timer value causes the increased power consumption when the first radio access technology is used.

The prioritization logic may be configured to start a validity timer to define a time span in which the penalty is applied to the measured received power. After expiry of the validity timer, the penalty is not applied to the measured parameter until the user equipment determines again that the first radio access technology should be avoided because of its impact on battery lifetime.

The user equipment may be operative to perform discontinuous reception while the user equipment is in the connected mode.

The user equipment may be operable for discontinuous reception in accordance with discontinuous reception parameters when using the first radio access technology. The prioritization logic may be configured to estimate a power consumption of the user equipment for the first radio access technology based on the inactivity timer value and based on the discontinuous reception parameters.

The prioritization logic may be configured to estimate a power consumption of the user equipment for the first radio access technology and a power consumption for the at least one second radio access technology. The prioritization logic may selectively adjust the measured parameter when the power consumption of the user equipment for the at least one second radio access technology is less than, or much less than, the power consumption for the first radio access technology.

According to another embodiment, a method of performing radio access technology prioritization is provided. The method is performed by a user equipment which is configured for wireless communication according to a first radio access technology and at least one second radio access technology. The user equipment is configured to make a transition from a connected mode to an idle mode in response to receiving a message from a first radio access network based on an inactivity timer value when operating in accordance with the first radio access technology. The method comprises determining whether the inactivity timer value causes an increased power consumption when the first radio access technology is used. The method comprises selectively adjusting a measured parameter of the first radio access technology if the inactivity timer value leads to the increased power consumption when the first radio access technology is used, the adjusted measured parameter being used as an input parameter of the radio access technology prioritization.

The measured network parameter may be a measured received power, i.e. signal strength, for the first radio access technology.

Adjusting the measured parameter may comprise applying a penalty to the measured received power if the inactivity timer value causes the increased power consumption when the first radio access technology is used.

The method may comprise starting a validity timer to define a time span in which the penalty is applied to the measured received power.

The user equipment may be operable for discontinuous reception in accordance with discontinuous reception parameters when using the first radio access technology. The method may comprise estimating a power consumption of the user equipment for the first radio access technology based on the inactivity timer value and based on the discontinuous reception parameters, to determine whether the inactivity timer value leads to an increased power consumption when the first radio access technology is used.

The method may comprise estimating a power consumption of the user equipment for the first radio access technology and a power consumption for the at least one second radio access technology. The measured parameter may be selectively adjusted when the power consumption of the user equipment for the at least one secand radio access technology is less than, or much less than, the power consumption for the first radio access technology.

In the user equipment and method in which a penalty is selectively applied to a measured quantity which is an input parameter of a radio access technology prioritization, the user equipment can reduce usage of the first radio access technology in case this would lead to a significantly shorter battery lifetime.

The first radio access technology may be a LTE radio access technology, i.e., the user equipment would perform communication according to E-UTRA. The at least one second radio access technology may use a protocol defined by WCDMA specifications. The at least one second radio access technology may have a fast dormancy.

A communication system according to an embodiment comprises a radio access network node according to an embodiment and a user equipment according to an embodiment.

Devices and methods according to embodiments allow a user equipment to improve its battery lifetime.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of exemplary radio access technologies, the embodiments are not limited to this field of application. The features of the various embodiments may be combined with each other unless specifically stated otherwise.

Figure 1:
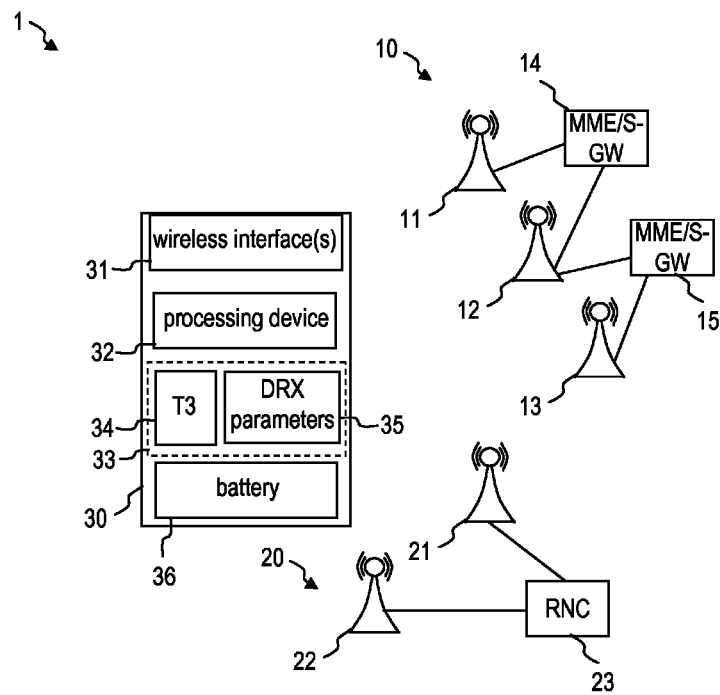
FIG. 1 is a schematic view of a communication system according to an embodiment.

FIG. 1 is a schematic view of a communication system 1 according to an embodiment. The communication system 1 comprises a user equipment (UE) 30. The UE 30 has a wireless interface 31 or several wireless interfaces 31 to communication with at least one radio access network (RAN).

A first RAN 10 may be a RAN of a first communication network operating according to LTE specifications. The first RAN 10 may be the Evolved Universal Terrestrial Radio Access (E-UTRA) of a LTE communication network. The first RAN 10 may comprise radio access network nodes 11-13. The nodes 11-13 may respectively be an evolved NodeB (eNodeB). The first communication network may comprise other nodes known to the skilled person. For illustration, a Mobility Management Entity (MME) or Serving Gateway (S-GW) 14, 15 may be connected to each eNodeB 11-13.

The air interface between the wireless interface 31 of the UE 30 and the eNodeB 11-13 may respectively be an E-UTRA air interface. The wireless interface 31 of the UE may be configured to communicate with the first RAN 10 in accordance with 3GPP specification TS 36.201 V11.1.0 (2012-12), entitled "3rd Generation Partnership Project; Technical Specification Group Radio Access Network; Evolved Universal Terrestrial Radio Access (E-UTRA); LTE physical layer; General description (Release 11)". The wireless interface 31 of the UE may be configured to transmit and receive information according to 3GPP specification TS 36.331 V11.3.0 (2013-03), entitled "3rd Generation Partnership Project; Technical Specification Group Radio Access Network; Evolved Universal Terrestrial Radio Access (E-UTRA); Radio Resource Control (RRC); Protocol specification (Release 11)".

The UE 30 may be configured to use radio access technologies other than LTE radio access technologies. For illustration, a second RAN 20 may provide coverage in addition to the first RAN 10 in some geographical areas. The second RAN 20 may be different from E-UTRAN. The second RAN 20 may be configured to operate in accordance with 3GPP WCDMA specifications, for example. The second RAN 20 may comprise radio access network nodes 21, 22. The radio access network nodes 21, 22 may be a NodeB of a Universal Mobile Telecommunications System (UMTS) communication network. The second RAN 20 may comprise a Radio Network Controller (RNC) 23.

When transmitting messages to and receiving messages from the first RAN 10, the UE 30 may use a first radio access technology (RAT). When transmitting messages to and receiving messages from the second RAN 20, the UE 30 may use a second RAT different from the first RAT. In other embodiments, the UE 30 does not need to be operative to use different RATs.

In the following, the first RAN 10 will be referred to as E-UTRAN 10. The first mobile communication network which includes the E-UTRAN 10 may accordingly be a mobile communication network in accordance with 3GPP LTE specifications, which will also be referred to as LTE network. The first RAT accordingly may be the radio access technology of the LTE network in accordance with the E-UTRA air interface.

The UE 30 may operate in different modes when using LTE. Transitions from a mode with higher energy consumption to a mode with lower energy consumption may respectively be determined using inactivity timers. In particular, a transition to an idle mode may be determined by an inactivity timer which is also referred to as "inactivity timer T3" in the art.

Further inactivity timers may be used to trigger transitions from, for example, an active state in which no discontinuous reception (DRX) is performed to a state with short DRX cycle, or transitions from the state with short DRX cycle to a state with long DRX cycle. The parameters which determine the operation of the UE when DRX is performed, e.g. the timing of transitions between different operation states, are also referred to as DRX parameters.

The inactivity timer values which determine the inactivity periods after which the UE 30 makes a transition to a state in which the wireless interface 31 has lower energy consumption are set by a radio access network node. For illustration, an eNodeB 11-13 may set the inactivity timer value which determines the time period of inactivity on the air interface after which an RRC connection release message is sent from the E-UTRAN 10 to the UE 30 to cause the UE 30 to enter idle mode. The UE 30 is typically not notified by the E-UTRAN 10 of the inactivity timer value which governs the transition to idle mode.

The inactivity timer value which determines when the UE 30 may enter the idle mode may be configured by the E-UTRAN 10 in a way which causes high power consumption and, hence, reduces battery lifetime of the UE 30.

To mitigate such problems, the UE 30 is configured to monitor the effect of the inactivity timer value on the power consumption of the UE 30. The UE 30 is configured to take measures which allow power consumption to be reduced when it is associated with a unfavourable inactivity timer value.

The UE 30 may be configured to determine when an inactivity timer value is set such that it unfavourable in terms of power consumption. The UE 30 may be configured to determine whether the inactivity timer value should be adjusted. The UE 30 may be configured to transmit, via the wireless interface 31, a signal to the E-UTRAN 10 to request an adjustment of the inactivity timer value.

The UE 30 may be configured to determine whether the inactivity timer value is to be increased to increase battery lifetime of a battery 36 of the UE 30. The UE 30 may transmit a signal to the E-UTRAN 10 to request the inactivity timer value to be increased, thereby prolonging the inactivity period on the air interface after which the E-UTRAN 10 transmits a message to the UE 30 to set it to idle mode.

The UE 30 may be configured to determine whether the inactivity timer value is to be decreased to increase battery lifetime of the UE 30. The UE 30 may transmit a signal to the E-UTRAN 10 to request the inactivity timer value to be decreased, thereby reducing the inactivity period on the air interface after which the E-UTRAN 10 transmits a message to the UE 30 to set it to idle mode.

In the manner described above, the UE 30 may provide a feedback to the E-UTRAN 10 on whether the current inactivity timer value is suitable. The UE 30 may perform a closed loop control of the inactivity timer. The UE 30 may determine how the current inactivity timer value affects the power consumption of the UE 30. The UE 30 may request an adjustment of the inactivity timer value and may again determine how the adjusted inactivity timer value affects the power consumption of the UE 30.

A node 11-13 of the E-UTRAN 10 may be configured to receive the signal from the UE 30. The node 11-13 of the E-UTRAN 10 may be configured to adjust the inactivity timer value in accordance with the signal received from the UE 30. The signal may include a field comprising one bit or more than one bit which indicates whether the inactivity timer value is to be increased or decreased. The node 11-13 of the E-UTRAN would then accordingly increase or decrease the inactivity timer value.

The operations of the UE 30 described above can be performed also when the UE 30 is configured to communicate only with the E-UTRAN 10. No coverage by a second RAN 20 is required to reduce the power consumption by a UE-initiated adjustment of the inactivity timer value.

Alternatively or additionally to requesting the adjustment of the inactivity timer value, the UE 30 may be configured to take the inactivity timer value and/or other DRX parameters into account when performing RAT prioritization. When the inactivity timer value and/or other DRX parameters set by the E-UTRAN 10 cause too high power consumption, the UE 30 may perform a prioritization in which the second RAN 20 may be preferred over the E-UTRAN 10 in cases where power consumption would otherwise be too high.

The UE 30 may adjust a measured parameter of the E-UTRAN 10 and may use the adjusted measured parameter in the prioritization procedure. The measured parameter may be a received power of the E-UTRAN 10 measured by the UE 30. The UE 30 may subtract a penalty from the measured received power to make it less likely that the E-UTRAN 10 is selected in cases where the UE 30 is located at a larger distance from the serving eNodeB.

The UE 30 may have a processing device 32 which controls operation of the UE 30. The processing device 32 may comprise one microprocessor or several microprocessors, one microcontroller or several microcontrollers, an application specific integrated circuit (ASIC) or a combination of such components. The processing device 32 may act as an analyzer logic which determines whether the inactivity timer value is unfavourable. The processing device 32 may be configured to determine the inactivity timer value and to store the value in a memory 33, as indicated at 34. The processing device 32 may control the wireless interface 31 to transmit the signal requesting an adjustment of the inactivity timer value to the E-UTRAN 10.

Alternatively or additionally, the processing device 32 may perform RAT prioritization. The processing device 32 may adjust input parameters of the RAT prioritization, e.g. by applying a penalty to a measured signal strength of the E-UTRAN 10, if the power consumption would be too high compared to communication with the second RAN 20.

The processing device 32 may determine the inactivity timer value by monitoring transitions from connected mode to idle mode performed by the UE 30. The processing device 32 may use the determined inactivity timer value to determine whether an adjustment of the inactivity timer value is to be requested and/or whether a penalty should be a applied to a measured quantity of the E-UTRAN 10 in RAT prioritization. The processing device 32 may additionally use other DRX parameters 35 stored in the memory 33 to determine whether an adjustment of the inactivity timer value is to be requested and/or whether a penalty should be a applied to a measured parameter of the E-UTRAN 10 in RAT prioritization.

Figure 2:
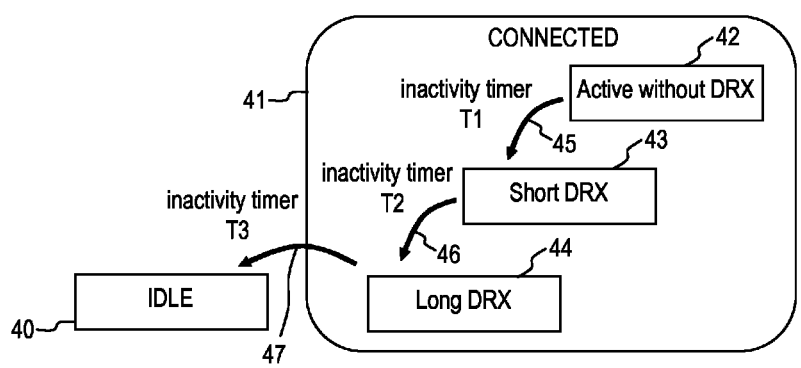
FIG. 2 is a schematic view illustrating modes of a user equipment according to an embodiment.

FIG. 2 is a schematic diagram illustrating different modes in which the UE 30 may operate when using the first RAT. The UE 30 may have an idle mode 40. The idle mode 40 is the mode with lowest power consumption. The UE 30 may be RRC disconnected while it is in the idle mode 40. The UE 30 may perform idle mode DRX while in the idle mode 40 to listen for messages from the E-UTRAN which are transmitted only in certain, pre-defined time windows. The UE may have a connected mode 41 in which it is RRC connected. The connected mode 41 may include various substates. For illustration, in an active state without DRX 42, the UE 30 may be operative without DRX. There may be one DRX state or several DRX states. There may be a short DRX state 43 having a short DRX cycle. There may be a long DRX state 44 having a long DRX cycle.

A transition 47 from the connected mode 41 to the idle mode 40 may be triggered when the E-UTRAN 10 detects an inactivity of the UE 30 on the air interface for a period defined by an inactivity timer value. This inactivity timer, frequently referred to as inactivity timer T3 in the art, resides in a node of the E-UTRAN 10. The E-UTRAN 10 transmits a message to the UE 30 upon expiry of the inactivity timer, which causes the UE 30 to enter the idle mode 40.

Further inactivity timers may be provided for triggering other transitions. A transition 45 from the active state without DRX 42 to the short DRX state 43 may be triggered by expiry of a further inactivity timer. This further inactivity timer is also referred to as inactivity timer T1 in the art. A transition 46 from the short DRX state 43 to the long DRX state 44 may be triggered by expiry of a further inactivity timer. This further inactivity timer is also referred to as inactivity timer T2 in the art.

When the UE 30 initiates a new data transfer it will move from the idle mode 40 to the active state without DRX 42 and will stay there until no data should be immediately transmitted. At that point of time the terminal will be moved to the DRX states 43, 44, where one short and a long DRX value are defined. After the different timer timeouts the UE 30 will thereafter move to idle mode 40 again, unless there will be more data to transfer, where the UE 30 immediately moves to active state without DRX 42 again.

The UE 30 may determine at least whether an adjustment of the inactivity timer value which governs the transition 47 to the idle mode may offer advantages in terms of power consumption. A UE-initiated adjustment of this inactivity timer value is implemented.

Figure 3:
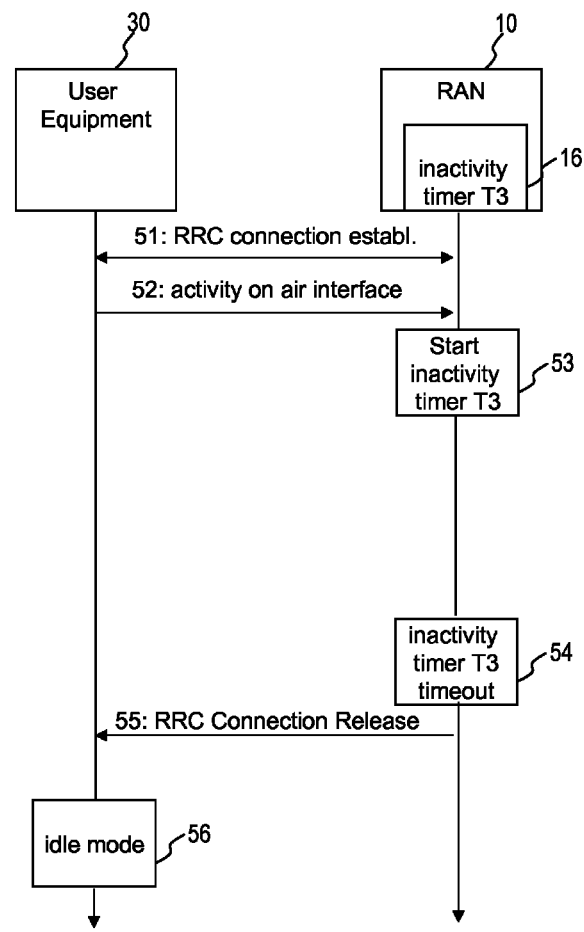
FIG. 3 is a diagram illustrating operation of a user equipment and a radio access network.

FIG. 3 illustrates operation of a communication system which includes the E-UTRAN 10 and the UE 30. The inactivity timer T3 16 triggers an RRC connection release and may reside in a node of the E-UTRAN 10, e.g. in an eNodeB.

At 51, an RRC connection establishment is performed. The RRC connection establishment may include various messages. Exemplary implementations may be used as defined in 3GPP specification TS 36.331 V11.3.0 (2013-03), entitled "3rd Generation Partnership Project; Technical Specification Group Radio Access Network; Evolved Universal Terrestrial Radio Access (E-UTRA); Radio Resource Control (RRC); Protocol specification (Release 11)", section 5.3.3.

At 52, there is some activity on the air interface between the UE 30 and the E-UTRAN. For illustration, the UE 30 may transmit data to the E-UTRAN or may receive data from the E-UTRAN. The UE 30 may be in the long DRX state 44 when transmitting or receiving the data.

At 53, the inactivity timer T3 is started. If there is no further activity on the air interface until the inactivity timer T3 expires, timeout of the inactivity timer will occur at 54.

In response to the timeout of the inactivity timer T3, the E-UTRAN 10 transmits a message 55 to the UE 30. The message 55 may be an RRC Connection Release message as defined in 3GPP specification TS 36.331 V11.3.0 (2013-03), entitled "3rd Generation Partnership Project; Technical Specification Group Radio Access Network; Evolved Universal Terrestrial Radio Access (E-UTRA); Radio Resource Control (RRC); Protocol specification (Release 11)", section 5.3.8. The UE may optionally transmit an RRC Connection Release Complete message.

In response to receiving the RRC Connection Release message 55, the UE 30 enters the idle mode at 56. As explained with reference to FIG. 2, an idle mode DRX may be performed while the UE 30 is in the idle mode. The UE 30 may be RRC disconnected when it is in the idle mode.

When the UE 30 determines that the inactivity timer value which defines when the timeout 54 occurs should be adjusted, the UE 30 may perform any one of the various procedures described herein. The UE 30 request an adjustment of the inactivity timer value. Alternatively or additionally, the UE 30 may perform an intelligent prioritization which takes the inactivity timer value into account.

There are various scenarios in which the inactivity timer value is unfavourable in the sense that the timing at which the UE 30 enters the idle mode and subsequently returns to an RRC connected mode. This may occur even when the E-UTRAN attempts to take power consumption at the UE 30 into consideration when setting the inactivity timer value. The reason is that the E-UTRAN needs to balance UE energy consumption with other targets, such as data transmission delays and/or network load.

Figure 4:
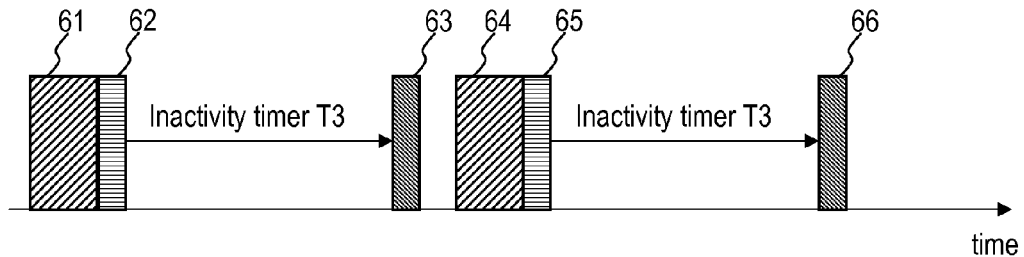
FIG. 4 is a diagram illustrating an exemplary scenario in which a user equipment according to an embodiment detects that the inactivity timer value is unfavourable.

FIG. 4 illustrates a scenario in which the E-UTRAN at a certain point moves the UE to idle mode, but the UE almost immediately starts a new data transfer. This is an unoptimized scenario because it involves unnecessary signalling for the RRC Connection Release followed by RRC Connection Reestablishment. An RRC Connection Reestablishment is a relatively signalling intense procedure, compared to maintaining the UE 30 in a DRX state 43, 44. The scenario as shown in FIG. 4 may occur in a streaming session, for example, where a modem of the UE 30 will be repeatedly activated to transfer data in order to refill its streaming buffer.

In FIG. 4, RRC Connection Establishment is performed by signalling 61. Data 62 is subsequently transferred over the air interface. For illustration, a streaming buffer may be filled. Expiry of the inactivity timer causes an RRC Connection Release 63. Shortly thereafter, an RRC Connection Reestablishment is performed by signalling 64. Data 65 is then transferred over the air interface. Expiry of the inactivity timer causes an RRC Connection Release 66. In the scenario shown in FIG. 4, the inactivity timers are set to a shorter value than the buffer refill pattern, and this causes an RRC release and reconnection for each buffer filling.

The additional power consumption associated with the RRC Connection Reestablishment is greater than the reduction in power consumption which results from the idle mode operation after the RRC Connection Release 63. The reason is that the inactivity timer value is too small, i.e. the UE 30 is caused to enter idle mode too quickly in this scenario.

The UE 30 is operative to detect this unfavourable selection of the inactivity timer value. The UE 30 may transmit a signal to request that the inactivity timer value is increased, allowing the UE 30 to remain longer in the long DRX state 44.

Figure 5:
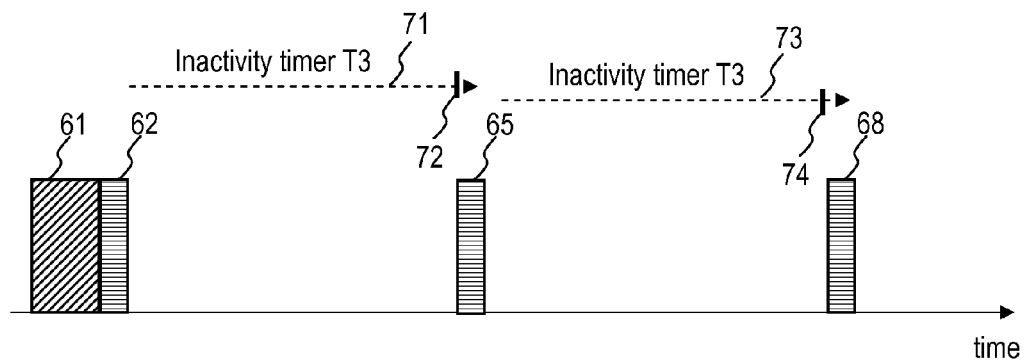
FIG. 5 is a diagram illustrating operation of the user equipment after adjustment of the inactivity timer value.

FIG. 5 illustrates the transmission of the data 62, 65 when the UE 30 has already transmitted a signal to request an increase of the inactivity timer value, and the E-UTRAN has accordingly increased the inactivity timer value.

The inactivity timer is started when transmission of the data 62 is complete. The increased inactivity timer value has the effect that transmission of the data 65 starts at a time 72 before the inactivity timer 71 expires. The inactivity timer 71 does not reach timeout. Similarly, the transmission of data 86 starts at a time 74 before timeout of an inactivity timer 73 occurs.

The increased inactivity timer value has the effect that the UE 30 is kept in a DRX state, e.g. in the long DRX state 44, for a longer inactivity time period before the UE 30 enters the idle mode. The excessive signalling illustrated in FIG. 4 and the associated power consumption may thereby be reduced.

Figure 6:
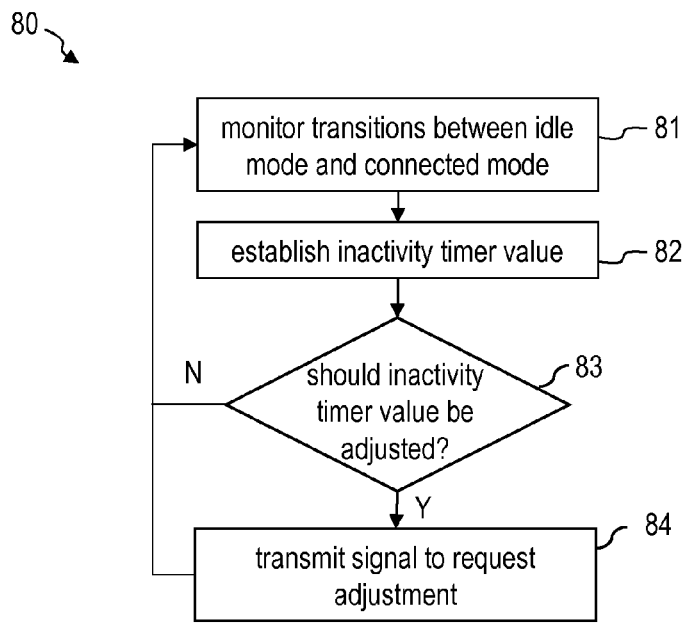
FIG. 6 is a flow chart of a method according to an embodiment.

FIG. 6 is a flow chart of a method 80 according to an embodiment. The method 80 may be performed by the UE 30. The processing device 32 of the UE 30 may perform the processing steps of the method 80.

At 81, transitions between idle mode and connected mode of the UE are monitored. The processing device 32 may monitor a state of a modem of the wireless interface 31 and/or power consumption of a modem of the wireless interface 31 to detect transitions from the connected mode to the idle mode and vice versa.

At 82, an inactivity timer value is established. The inactivity timer value may be established by detecting after which inactivity period an RRC Connection Release message is received from the E-UTRAN.

At 83, it is determined whether the inactivity timer value is to be adjusted. This may be done in a variety of ways.

In one implementation, it may be determined whether a time delay between RRC Connection Release, i.e. the start of idle mode operation, and RRC Connection Reestablishment is short. The time delay may be compared to a reference time to determine whether the inactivity timer value should be increased.

Other techniques may be used to determine whether the inactivity timer value is to be adjusted. For illustration, a power consumption may be computed for the current inactivity timer value. This may be compared to a fictitious power consumption computed for the same data transmission, but assuming that the UE had remained in a DRX state instead of entering idle mode and then performing RRC Connection Reestablishment.

The DRX parameters may be taken into account when determining whether the inactivity timer value is to be adjusted. For illustration, a cycle time of the long DRX state 44 may be taken into account when determining whether a power consumption will be lower if the UE remains in the long DRX state 44 instead of entering idle mode and then performing RRC Connection Reestablishment.

Vice versa, it may also be determined whether the power consumption could be reduced by decreasing the inactivity timer value. For illustration, if the rate at which data transmission over the air interface occurs is small, it may be more energy efficient to enter idle mode after a short inactivity time.

If it is determined that the inactivity timer value is not to be adjusted, the method may return to step 81.

At 84, if it is determined that the inactivity timer value is to be adjusted, the UE transmits a signal to request an adjustment of the inactivity timer value. The signal may indicate whether the inactivity timer value is to be increased or whether the inactivity timer value is to be decreased. The signal may be an RRC Reconfiguration Request message sent from the UE to the E-UTRAN.

The method may then return to step 81. The UE may continue to monitor whether power will be saved if the inactivity timer value is adjusted. The UE may transmit another signal requesting an adjustment of the inactivity timer value if additional changes to the inactivity timer value should be made.

The UE has use case knowledge and, hence, the possibility to predict modem usage for the wireless interface. A decision on whether the inactivity timer value should be adjusted is typically more efficient when performed by the UE than reactive alternatives for such analysis residing in the E-UTRAN.

Figure 7:
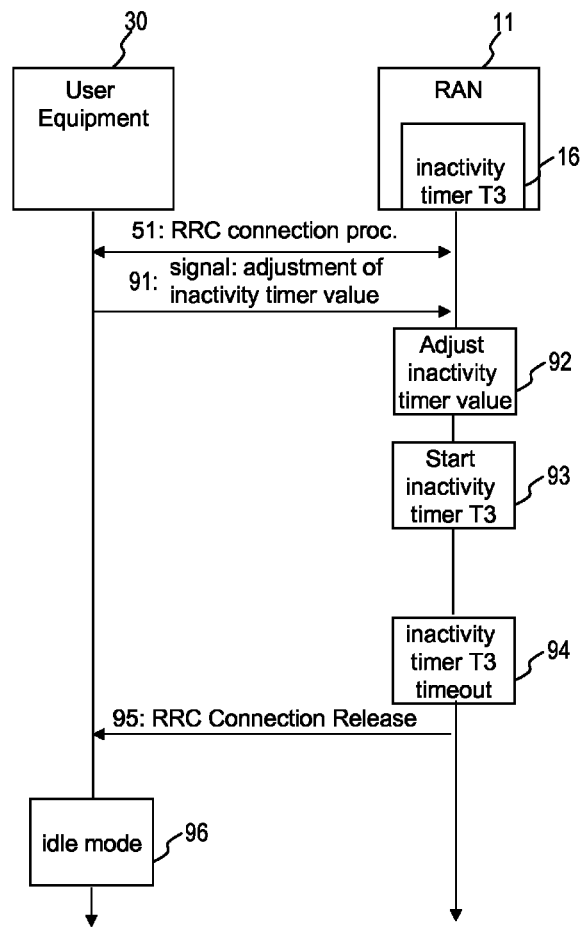
FIG. 7 is a diagram illustrating operation of a user equipment and a radio access network node when the user equipment requests an adjustment of an inactivity timer value.

FIG. 7 illustrates operation of a communication system which includes the E-UTRAN 10 and the UE 30, similar to FIG. 3, when the UE 30 requests an adjustment of the inactivity timer value.

After the RRC Connection Establishment 51, there is some data transfer (not shown in FIG. 7) during which the UE determines that the inactivity timer value set by the E-UTRAN is to be adjusted.

The UE 30 transmits a signal 91 requesting an adjustment of the inactivity timer value. The signal 91 may be an RRC Connection Reconfiguration message.

At 92, in response to receiving the signal 91, the E-UTRAN 10 adjusts the inactivity timer value for the UE 30. A node of the E-UTRAN 10 may selectively increase or decrease the inactivity timer value, depending on the signal 91 transmitted by the UE 30. The E-UTRAN 10 may transmit a message confirming the adjustment of the inactivity timer value to the UE 30. In other implementations, the E-UTRAN may start using the adjusted inactivity timer value without transmitting a dedicated message to the UE 30 confirming the adjustment.

The E-UTRAN may take a decision on whether the requested adjustment of the inactivity timer value may be performed. The E-UTRAN may evaluate a decision function which depends on the requested adjustment, but which may also depend on other factors such as data transmission delays and/or network loads. The E-UTRAN may adjust the inactivity timer value selectively depending on whether the adjusted inactivity timer value is acceptable with a view to data transmission delays and/or network loads.

The inactivity timer may be started at 93. Timeout of the inactivity timer occurs at 94. The E-UTRAN 10 causes the UE 30 to enter idle mode. The E-UTRAN 10 may transmit the RRC Connection Release message 94. The period of inactivity on the air interface after which the E-UTRAN 10 transmits the message 94 to make the UE 30 enter idle mode is a function of the adjusted inactivity timer value.

The UE 30 may operate in the idle mode at 95 until data are to be transferred, for example, in which case the UE 30 may return to the active state without DRX 42.

Figure 8:
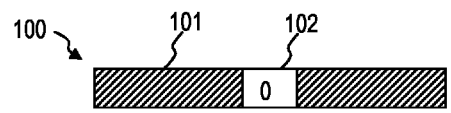
FIG. 8 is a schematic representation of a signal transmitted by the user equipment to request an adjustment of an inactivity timer value.

FIG. 8 is a schematic view showing a signal 100 transmitted by the UE to request an adjustment of the inactivity timer value. The signal 100 may be a message according to 3GPP specification TS 36.331 V11.3.0 (2013-03), entitled "3rd Generation Partnership Project; Technical Specification Group Radio Access Network; Evolved Universal Terrestrial Radio Access (E-UTRA); Radio Resource Control (RRC); Protocol specification (Release 11)". The signal 100 may be an RRC Reconfiguration message or a simplified version of the RRC Connection Reconfiguration message defined in section 5.3.5 of the above-mentioned 3GPP specification TS 36.331.

The signal 100 may include a purpose data field 102 which indicates whether the inactivity timer value is to be increased or decreased. The purpose data field 102 may be a purpose bit. The purpose data field 102 may have a first indicator if the UE requests the inactivity timer value to be increased. The purpose data field 103 may have a second indicator if the UE requests the inactivity timer value to be decreased. If the purpose data field 102 is a purpose bit, one logical value (e.g. "1") may indicate that the inactivity timer value is to be increased, and the other logical value (e.g. "0") may indicate that the inactivity timer value is to be decreased. The signal 100 may include additional data 101 as required by the RRC protocol.

The UE may perform one threshold comparison or several threshold comparisons to determine whether the inactivity timer value is to be adjusted.

Figure 9:
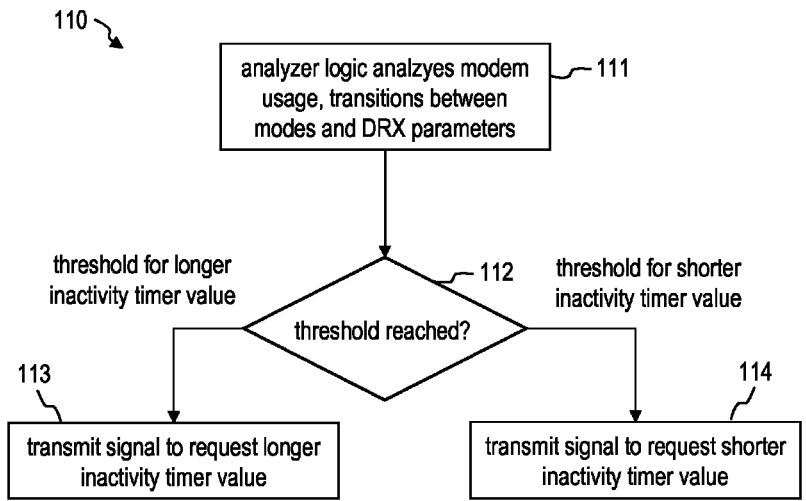
FIG. 9 is a flow chart of a method according to an embodiment.

FIG. 9 is a flow chart of a method 110 according to an embodiment. The method 110 may be performed by the UE 30.

At 111, an analyzer logic of the UE 30 analyzes modem usage of a modem of the wireless interface, transitions between UE modes and, optionally, other DRX parameters. These other DRX parameters may include the short cycle time and/or the long cycle time of the DRX states 43, 44, for example.

At 112, the analyzer logic determines whether the inactivity timer value is unfavourable. The analyzer logic may perform a threshold comparison to determine whether the inactivity timer value is unfavourable.

In one implementation, the analyzer logic may compute a range of inactivity timer values which lead to acceptable power consumption. The range may be computed based on the monitored modem usage. The analyzer logic may establish the current inactivity timer value by monitoring transitions from the connected mode to the idle mode. The analyzer logic may verify whether the established inactivity timer value is included in the computed range.

In another implementation, the analyzer logic may compute a power consumption which would result for a greater inactivity timer value and a power consumption which would result for a smaller inactivity timer value. The analyzer logic may compare a power consumption which results from the current inactivity timer value to the computed power consumptions which would be attained for longer and shorter inactivity timer values, respectively.

If an adjustment of the inactivity timer value is to be requested, the UE provides a feedback on the inactivity timer value to the E-UTRAN.

At 113, if the threshold comparison shows that a greater inactivity timer value, i.e. a longer inactivity time, would lead to a reduced power consumption, a signal is transmitted to request the inactivity timer value to be increased.

At 114, if the threshold comparison shows that a smaller inactivity timer value, i.e. a shorter inactivity time, would lead to a reduced power consumption, a signal is transmitted to request the inactivity timer value to be decreased.

Figure 10:
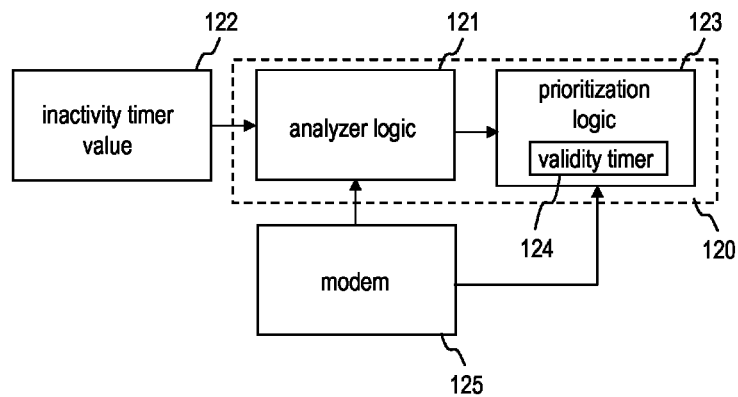
FIG. 10 is a block diagram representation of functional units of a user equipment according to an embodiment.

FIG. 10 is a functional block diagram representation of a UE. The wireless interface includes a modem 125. Modem usage of the modem 125 depends on the data transfers, e.g. on whether streaming is performed with a certain streaming pattern. The processing device of the UE may perform several functions represented as functional blocks 121, 123 in FIG. 10, to thereby act as a power consumption optimization logic.

An analyzer logic 121 may monitor transitions between connected mode and idle mode of the UE. The analyzer logic 121 may determine the inactivity timer value from the monitored transitions. The analyzer logic 121 may retrieve the inactivity timer value from a buffer 122 where it is stored by the analyzer logic, to determine whether the inactivity timer value should be increased to prolong the inactivity period or reduced to shorten the inactivity period. The analyzer logic may perform the processing described with reference to FIG. 9 to determine whether the inactivity timer value is to be increased or decreased.

The analyzer logic 121 may also monitor whether the E-UTRAN adjusts the inactivity timer value in response to transmission of a signal requesting such an adjustment by the UE. The analyzer logic 121 may continue to monitor transitions between connected mode and idle mode after transmission of the signal to verify whether the inactivity timer value was adjusted. The analyzer logic 121 may determine whether the power consumption after the adjustment of the inactivity timer value is sufficient.

A prioritization logic 123 may perform RAT prioritization. The prioritization logic 123 may decide whether a first RAT should be used to establish a connection with the E-UTRAN or whether a different second RAT should be used. As will be explained in more detail with reference to FIG. 11 to FIG. 15, the prioritization logic 123 may apply a penalty to a measured parameter of the E-UTRAN, such as a received power from an eNodeB which is measured at the UE and which is used in the prioritization, if power consumption could be reduced further when using the second RAT. The prioritization logic 123 may use a validity timer 124 which defines a time span over which the penalty applies to the measured parameter. The prioritization logic 123 may apply the penalty selectively depending on whether power consumption could be reduced by decreasing the probability of using the first RAT. The prioritization logic 123 may perform this evaluation based on modem usage and/or DRX parameters and/or monitored transitions between the connected mode and the idle mode.

The analyzer logic 121 and prioritization logic 123 fulfil the function of a power consumption optimization logic 120.

Figure 11:
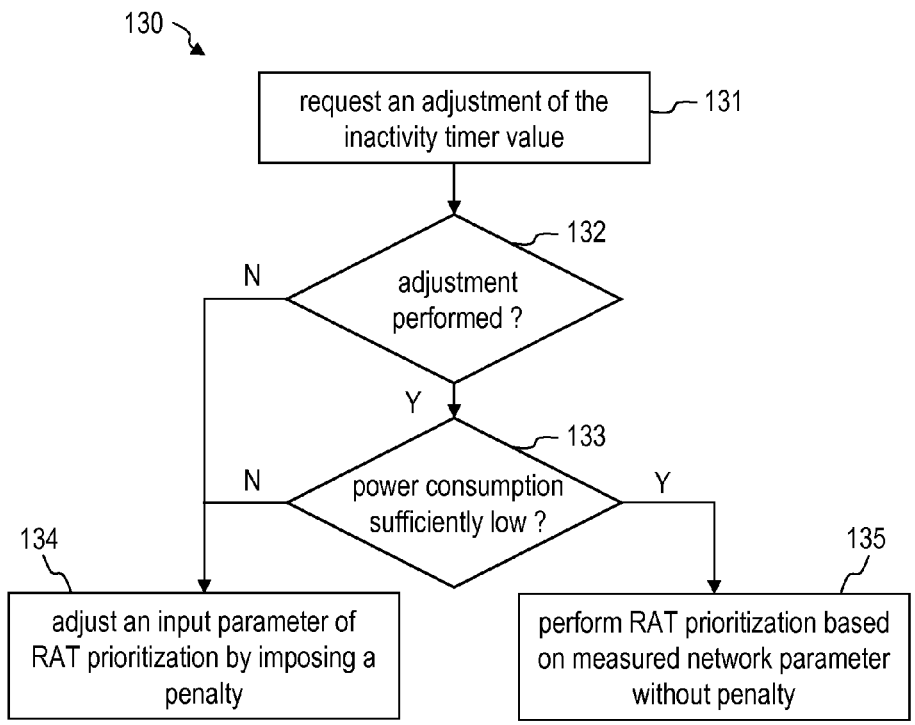
FIG. 11 is a flow chart of a method according to another embodiment.

FIG. 11 is a flow chart of a method 130 according to an embodiment. The method 130 may be performed by the UE 30.

At 131, the UE 30 transmits a signal to request an adjustment of the inactivity timer value. This may be implemented as explained with reference to any one of FIG. 1 to FIG. 10.

At 132, the UE 30 determines whether the E-UTRAN adjusted the inactivity timer value in accordance with the request. Transitions from connected mode to idle mode may be monitored after transmission of the signal to detect whether the E-UTRAN adjusted the inactivity timer value. If it is determined that the inactivity timer value was adjusted, the method continues at step 133. Otherwise, the method proceeds to step 134.

At 133, the UE 30 determines whether the power consumption after the adjustment of the inactivity timer fulfils a certain criterion. For illustration, the power consumption may be compared to a threshold. If it is determined that the power consumption is sufficiently low, the method continues at step 135. If it is determined that a lower power consumption would be desirable, even when taking into account the switching of RATs, the method proceeds to step 134.

At step 134, an input parameter of a RAT prioritization is adjusted by imposing a penalty onto a measured parameter. The measured parameter may be a received power received from an eNodeB and measured by the UE. The penalty may be imposed by computing a reduced received power from the actually measured received power. For illustration, the measured received power may be reduced by subtracting a penalty from the measured received power, by adding a negative penalty, or by multiplying the measured received power by a factor smaller than one. When the received power measured at the UE is still large even when the penalty is applied, communication with the E-UTRAN is still preferred over other RANs. However, if the real received power measured at the UE is already small because the UE is located at a larger distance from the eNodeB, other RANs may be preferred when available because the UE would then also have to use a high output power, which would further decrease the batter lifetime.

The RAT prioritization is based on the measured parameter of the first RAT and may optionally be based on one or several measured parameters of the second RAT. The RAT prioritization may also depend on other input parameters, e.g. data transmission speeds for the first RAT and the second RAT.

The RAT prioritization may comprise evaluating a decision function. The measured network parameter, with the penalty applied thereto if applicable, is an input parameter of the decision function. Depending on whether the evaluated decision function has a value which exceeds a threshold, a decision is made to give priority to the first RAT over the second RAT, or vice versa.

At step 135, if the inactivity timer value is favourable in terms of power consumption, conventional RAT prioritization may be performed. The measured parameter of the E-UTRAN, e.g. the measured received power, may be directly input to the RAT prioritization without applying any penalty.

Figure 12:
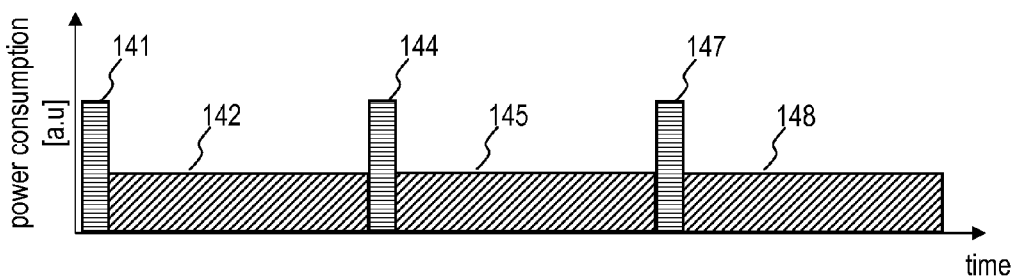
FIG. 12 is a diagram illustrating a power consumption in a scenario in which a user equipment according to an embodiment detects that power consumption is unfavourable when using a first radio access technology.
Figure 13:
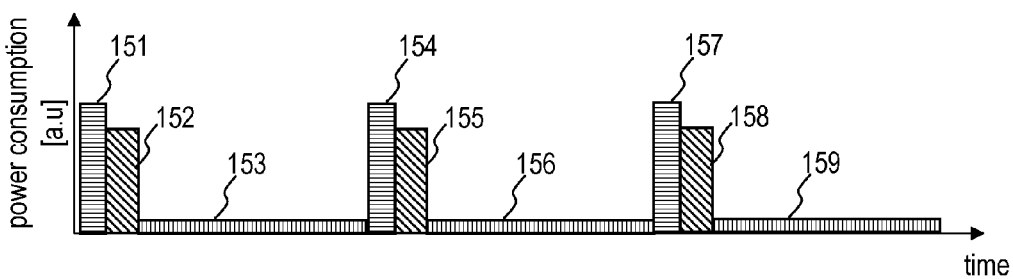
FIG. 13 is a diagram illustrating power consumption after the user equipment performs intelligent radio access technology prioritization.

FIG. 12 and FIG. 13 illustrate a scenario in which a penalty may be imposed on a measured parameter of the E-UTRAN to make usage of LTE less likely when the inactivity timer, and possibly other DRX parameters, are unfavourable. The power consumption illustrated in FIG. 12 and FIG. 13 results for an application traffic in which repeated short transmissions occur.

FIG. 12 illustrates the power consumption when LTE is used, but the inactivity timer and possibly other DRX settings are unfavourable. Data activity occurs at 141, 144, and 147 and is respectively associated with a high power consumption.

A long inactivity timer value may cause the UE to remain in the active state 42 or in a DRX state 43, 44. In the respective waiting periods at 142, 145, 148, the power consumption may be still fairly large. The long inactivity timer value in this case prevents the UE from entering idle mode.

In such a case, the UE detects that power consumption is unfavourable when using LTE. By applying a penalty to a measured parameter of the E-UTRAN, the UE becomes more likely to use another RAT.

FIG. 13 illustrates the power consumption of the same application traffic as in FIG. 12, but when using WCDMA, for example. Data activity occurs at 151, 154, and 157. The fast dormancy of WCDMA may be used for the application traffic illustrated in FIG. 13. Fast dormancy is used at 152, 155, and 158. At 153, 156, 159, the UE is in idle mode. The overall power consumption is reduced compared to the power consumption illustrated in FIG. 12.

By performing an RAT prioritization in which a penalty may be selectively applied to a measured parameter, as explained with reference to FIG. 10 to FIG. 13, the UE 30 can reduce usage of LTE in favour of other radio access technologies in case usage of LTE would be significantly worse for battery lifetime. The prioritization scheme does not prevent the UE 30 from using LTE, but rather limits the usage in case other options are available. As illustrated in FIG. 12 and FIG. 13, such a technique offers advantages when a LTE capable terminal with relatively large amount of chatty application traffic is camping on an LTE network with an inactivity timer or other DRX settings which is unfavourable for the power consumption.

Figure 14:
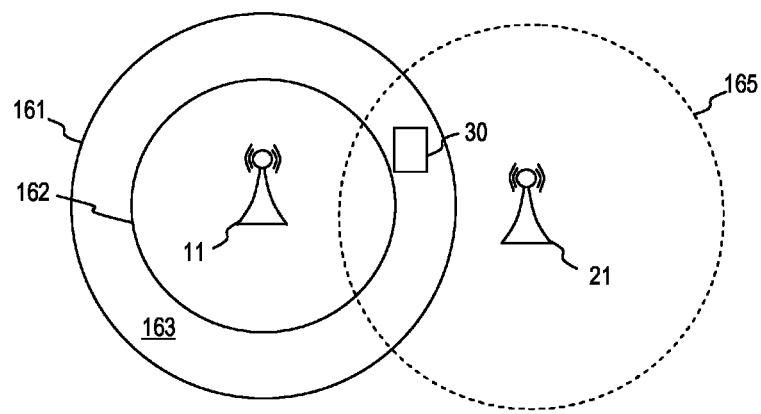
FIG. 14 is a schematic view illustrating the radio access technology prioritization performed by a user equipment according to an embodiment.

FIG. 14 illustrates the effect of the prioritization performed in dependence on the impact of inactivity timer values and other DRX settings on the power consumption. When the UE 30 is located far away from the eNodeB 11 and the transmission power of the UE and corresponding UE battery consumption is high, the likelihood of using LTE is further reduced. This will not reduce the general coverage of LTE since the UE 30 can still use the actually measured received power to indicate to the eNodeB 11 if or when terminal is out of coverage. The only impact is in terms of relative comparison between current LTE cell and other radio access technologies. The UE 30 also still needs to confirm that another candidate radio access technology cell 165 is available and has good enough radio signal quality to be a candidate to be used.

When the UE 30 is close to the eNodeB 11, e.g. if it is located in an area 162, the LTE technology will likely still be used even if the inactivity timer value and other DRX setting are unfavourable. The reason is that the relative power consumption can be small when terminal output power is low, so the gain from switching to another radio access technology is smaller. When the UE 30 is located in an area 163 of a cell 161 which is more remote from the eNodeB 11, the UE 30 is less likely to use LTE by applying the penalty. Use of LTE is, however, not prevented. I.e., the RAT prioritization for increased battery lifetime is done in a smooth way and with low end user impact.

To attain this smooth and intelligent RAT prioritization for increased battery lifetime, the measured received power of the eNodeB measured internally at the UE 30 may be reduced by applying a penalty. In idle mode, the UE 30 performs internal measurements of received power for each RAT of interest. In idle mode the UE 30 measures received power and quality itself and takes own decisions on what network and cell to camp on. When the UE 30 is in active communication with a base station, the UE 30 will stay in the active cell as long as its received power and quality is good enough. In case the received power and/or quality received by the UE 30 is lower than a defined threshold the UE will report this event to the base station. The base station will then ensure that the UE can use so-called measurement gaps in order to measure what other cells and radio access technologies are available for potential handover. Based on UE measurement reports of different received power and quality, the respective base station will take potential handover decisions.

The received power measured at the UE which can be modified for RAT prioritization by applying a penalty is thus available at the UE at any rate. The unmodified, i.e. correct measured received power may still be used to make decisions on potential handovers.

Figure 15:
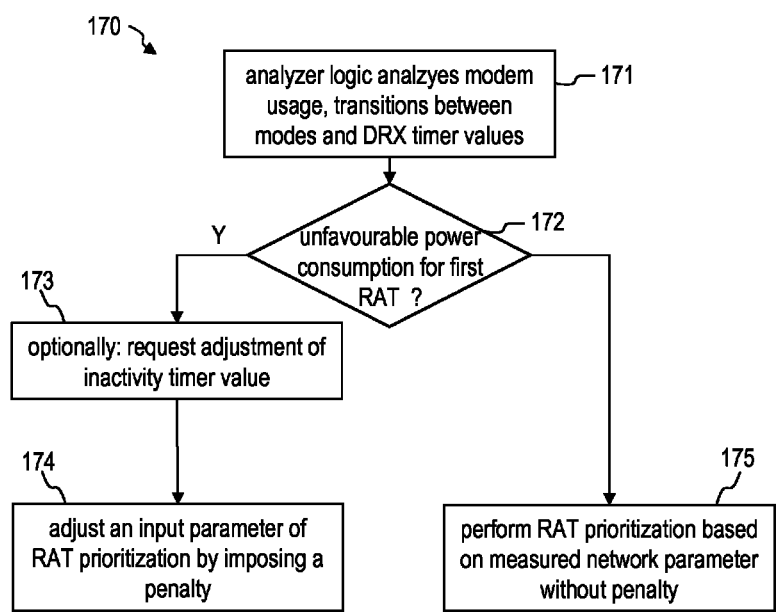
FIG. 15 is a flow chart of a method according to an embodiment.

FIG. 15 is a flow chart of a method 170 according to an embodiment. The method 170 may be performed by a UE 30 according to an embodiment.

At 171, during UE modem activities, an analyzer logic within the terminal stores network parameter information. This network parameter information may comprise DRX parameters, inactivity timers, average data rates and average terminal transmission output power, without being limited thereto.

At 172, the analyzer logic determines whether the network parameter information for LTE is unfavourable, in terms of power consumption, compared to the network parameter information for one or several other candidate RATs. If the network parameter information for LTE leads to a high power consumption, the method proceeds to step 173, which is optional, and then to step 174. If the network parameter information for LTE do not lead to a high power consumption, the method proceeds to step 175.

At 173, the UE may optionally transmit a signal to the E-UTRAN to signal that the inactivity timer value is non-optimal. This may be performed as described with reference to FIG. 1 to FIG. 10.

At 174, the UE applies a penalty to its measurement reporting of LTE received power. The UE may set an internal validity timer for how long this penalty should be applied. This will result in a temporarily lower usage probability of LTE. The terminal will report in more instants that the relative signal strength of LTE is lower than for other RATs. When the validity timer expired, the UE will utilize default measurement reporting instead. The length of the validity timer may be greater than a minute, e.g. one hour or longer, to prevent ping-pong-type behaviour.

At 175, if the decision step 172 shows that the network parameter information for LTE is not unfavourable for power consumption, conventional RAT prioritization is performed. No penalty is applied to the measured received power.

Various effects are attained by the devices and methods according to embodiments.

For illustration, a UE—to—network signal may indicate that the current DRX settings are unfavourable. The signal has the effect of informing the network that the UE should be allowed to remain longer in the connected mode instead of doing repeated RRC disconnections and connections, or alternatively to move quicker into idle mode.

For further illustration, a soft RAT prioritization may be implemented in a controlled manner. All available radio access technologies can be used, but the LTE network can be avoided in scenarios where the UE output power would be relatively high and another RAT is available when the inactivity timer value or other DRX settings are unfavourable.

While exemplary embodiments have been described with reference to the drawings, modifications may be implemented in other embodiments. For illustration, the UE may be a mobile phone or another mobile terminal. Further, while exemplary network technologies have been described, embodiments of the invention may be used in combination with other network technologies.

The operation of the various functional units may be implemented by hardware, by software, or a combination thereof. For illustration, the functions of the analyzer logic and/or the prioritization logic may be performed by a microprocessor or microcontroller which executes instructions programmed in a non-volatile memory.

The invention claimed is:

1. A user equipment, wherein the user equipment has an idle mode and a connected mode, the user equipment comprising:
   a wireless interface configured to receive a message from a mobile communication network causing the user equipment to make a transition from the connected mode to the idle mode after inactivity of the user equipment for a time period defined by a network-selected current inactivity timer value; and
   a processing device configured to:
      determine whether power consumption by the user equipment would be reduced by a change to the current inactivity timer value as selected by the mobile communication network by executing analyzer logic adapted to monitor transitions between the connected mode and the idle mode in accordance with the network-selected current inactivity timer value and determine that one of an increase or decrease to the network-selected current inactivity timer will have an estimated power consumption less than a current power consumption by comparing the current power consumption to computed power consumptions that would be obtained for longer and shorter inactivity values, respectively, and
      control the wireless interface to transmit a signal to the mobile communication network to request one of an increase or decrease to the current inactivity timer value selected at the mobile communication network.

2. The user equipment of claim 1, wherein the processing device is configured to analyse a timing of the transitions between the connected mode and the idle mode.

3. The user equipment of claim 1, wherein the processing device is configured to establish the current inactivity timer value based on the monitored transitions, to compare the established current inactivity timer value to a first threshold to determine whether the current inactivity timer value is to be increased, and to compare the established current inactivity timer value to a second threshold to determine whether the current inactivity timer value is to be decreased, the second threshold being different from the first threshold.

4. The user equipment of claim 3, wherein the user equipment is configured to perform discontinuous reception when in the connected mode, wherein the wireless interface comprises a component which is controlled according to a further timer value when the user equipment is in a discontinuous reception state, the further timer value being set in the user equipment by another message received from the mobile communication network, and wherein the processing device is configured to determine the second threshold in dependence on the further timer value.

5. The user equipment of claim 1, wherein the signal comprises one of a first indicator indicating that the current inactivity timer value is to be increased or a second indicator indicating that the current inactivity timer value is to be decreased.

6. The user equipment of claim 5, wherein the user equipment remains in the connected mode for an increased time period after transmission of the signal which comprises the first indicator.

7. The user equipment of claim 1, wherein the signal is a Radio Resource Control reconfiguration message.

8. The user equipment of claim 1, wherein the processing device is configured to perform a radio access technology prioritization which depends on a measured parameter of a radio access network of the mobile communication network, and wherein the processing device is configured to selectively apply a penalty to the measured parameter of the radio access network.

9. The user equipment of claim 1, wherein the analyzer logic:
   computes, based on the monitored transitions between the connected mode and the idle mode, a first power consumption that results from the current inactivity timer;

computes, based on the monitored transitions between the connected mode and the idle mode, a second power consumption that would result from a second inactivity timer value, the second inactivity timer value being greater than the current inactivity timer;

computes, based on the monitored transitions between the connected mode and the idle mode, a third power consumption that results from a third inactivity timer value, the third inactivity timer value being smaller than the current inactivity timer; and determines that the current inactivity timer should be increased if the second power consumption is less than first power consumption or that the current inactivity timer should be decreased if the third power consumption is less than the first power consumption.

10. The user equipment of claim 1, wherein the analyzer logic:
computes, based on the monitored transitions between the connected mode and the idle mode, a range of acceptable inactivity timer values leading to a predefined acceptable power consumption; and
determines that the current inactivity timer value is not contained within the range of acceptable inactivity timer values.

11. A radio access network node, configured to:
set a network-selected current inactivity timer value for a user equipment, the user equipment comprises a processing device using an analyzer logic adapted to determine whether power consumption by the user equipment would be reduced by a change to the current inactivity timer value by the analyzer logic monitoring transitions between a connected mode and an idle mode in accordance with the network-selected current inactivity timer and determining that one of an increase or decrease to the network-selected current inactivity timer will have an estimated power consumption less than a current power consumption based on comparing the current power consumption to computed power consumptions that would be obtained for longer and shorter inactivity values, respectively,
transmit a message to the user equipment causing the user equipment to enter an idle mode in response to detecting an inactivity of the user equipment for a time period defined by the current inactivity timer value,
receive a signal from the user equipment requesting one of an increase or decrease to the current inactivity timer value, and
adjust the current inactivity timer value at the radio access network node in response to the received signal.

12. The radio access network node of claim 11, wherein the network node is configured
to increase the current inactivity timer value if the signal comprises a first indicator indicating that the current inactivity timer value is to be increased, and
to decrease the current inactivity timer value if the signal comprises a second indicator indicating that the current inactivity timer value is to be decreased.

13. A method of controlling transitions between an idle mode and a connected mode of a user equipment, the method comprising:
receiving, by the user equipment, a message from a mobile communication network causing the user equipment to make a transition from the connected mode to the idle mode after inactivity for a time period defined by a network-selected current inactivity timer value;
determining, by the user equipment, whether power consumption by the user equipment would be reduced by a change to the current inactivity timer value as selected by the mobile communication network by executing analyzer logic adapted to monitor transitions between the connected mode and the idle mode in accordance with the network-selected current inactivity timer value and determine that one of an increase or decrease to the network-selected current inactivity timer will have an estimated power consumption less than a current power consumption by comparing the current power consumption to computed power consumptions that would be obtained for longer and shorter inactivity values, respectively;
transmitting, by the user equipment, a signal to the mobile communication network to request one of an increase or a decrease to the current inactivity timer value selected at the mobile communication network.

14. A user equipment comprising:
at least one wireless interface configured for wireless communication according to a first radio access technology and at least one second radio access technology, wherein the user equipment is configured to make a transition from a connected mode to an idle mode in response to receiving a message from a first radio access network based on an inactivity timer value when operating in accordance with the first radio access technology, and
a prioritization logic configured to perform radio access technology prioritization, the prioritization logic being configured
to determine whether the inactivity timer value causes an increased power consumption when the first radio access technology is used, and
to selectively adjust a measured parameter of the first radio access technology if the inactivity timer value causes the increased power consumption when the first radio access technology is used, the adjusted measured parameter being used as an input parameter of the radio access technology prioritization.

15. The user equipment of claim 14,
wherein the measured network parameter is a measured received power for the first radio access technology, and
wherein the prioritization logic is configured to apply a penalty to the measured received power if the inactivity timer value causes the increased power consumption when the first radio access technology is used.

16. The user equipment of claim 15,
wherein the prioritization logic is configured to start a validity timer to define a time span in which the penalty is applied to the measured received power.

17. The user equipment of claim 14,
wherein the user equipment is operable for discontinuous reception in accordance with discontinuous reception parameters when using the first radio access technology,
wherein the prioritization logic is configured to estimate a power consumption for the first radio access technology based on the inactivity timer value and based on the discontinuous reception parameters.

18. A method of performing radio access technology prioritization for a user equipment which is configured for wireless communication according to a first radio access technology and at least one second radio access technology, wherein the user equipment is configured to make a transition from a connected mode to an idle mode in response to receiving a message from a first radio access network based on an inactivity timer value when operating in accordance with the first radio access technology, the method comprising:
  determining whether the inactivity timer value causes an increased power consumption when the first radio access technology is used, and
  selectively adjusting a measured parameter of the first radio access technology if the inactivity timer value causes the increased power consumption when the first radio access technology is used, the adjusted measured parameter being used as an input parameter of the radio access technology prioritization.

* * * * *